United States Patent [19]

Chaveron et al.

[11] Patent Number: 4,803,089
[45] Date of Patent: Feb. 7, 1989

[54] PROCESS FOR TREATING DAIRY BY-PRODUCTS

[75] Inventors: Michel Chaveron, La Tour-de-Peilz; Fred Neumann, Steffisburg, both of Switzerland

[73] Assignee: Nestec S.A., Vevey, Switzerland

[21] Appl. No.: 45,757

[22] Filed: Apr. 28, 1987

Related U.S. Application Data

[63] Continuation of Ser. No. 700,765, Feb. 12, 1985, abandoned.

[30] Foreign Application Priority Data

Mar. 2, 1984 [EP] European Pat. Off. ........ 84102225.4

[51] Int. Cl.⁴ ...................... A23C 9/144; A23C 9/146
[52] U.S. Cl. .................................... 426/239; 426/271; 426/491; 426/583; 210/677
[58] Field of Search ................. 426/41, 271, 583, 491, 426/239; 210/663, 669, 677, 681

[56] References Cited

U.S. PATENT DOCUMENTS

| | | | |
|---|---|---|---|
| 2,778,750 | 1/1957 | Hull | 426/271 |
| 3,618,589 | 11/1971 | Tavani | 210/677 |
| 4,138,501 | 2/1979 | Chaveron et al. | 426/271 |
| 4,159,350 | 6/1979 | Jönsson | 426/271 |
| 4,352,828 | 10/1982 | Rialland et al. | 426/271 |
| 4,423,081 | 12/1983 | Salmon | 426/271 |
| 4,520,036 | 5/1985 | Rialland et al. | 426/271 |

FOREIGN PATENT DOCUMENTS 1583814 2/1981 United Kingdom .

OTHER PUBLICATIONS

Delbeke, R., "Purification of an Ultrafiltration Permeate with Adsorbent and Ion-Exchange Resins," *Netherlands Milk & Dairy Journal*, vol. 33, No. 4, (1979) Wageningen

*Primary Examiner*—Marianne Cintins
*Attorney, Agent, or Firm*—Vogt & O'Donnell

[57] ABSTRACT

The invention relates to a process for the decationization of by-products of milk, particularly whey for cheesemaking, by ion exchange, comprising passing the by-product in liquid form successively through a weak cationic resin and then through a strong cationic resin and then regenerating the resins by passing an acid successively through the strong cationic resin and then through the weak cationic resin.

This process enables the strong cationic resin to be utilized to 90% of its capacity and from 30 to 40% of regeneration reactant to be saved. The product obtained serves as an intermediate in the production of lactoproteins and demineralized lactoserum products suitable for human and animal nutrition.

15 Claims, 1 Drawing Sheet

PROCESS FOR TREATING DAIRY BY-PRODUCTS

This is a continuation application of application Ser. No. 700,765 filed Feb. 12, 1985, now abandoned.

This invention relates to a process for treating by-products of milk to reduce their content of mineral cations.

Whey is the by-product of the conversion of milk into cheese, casein or casein derivatives. The utilization of this by-product is necessary to reduce the volume of the effluents which have to be treated in purification plants. Most whey is dried to form a powder which is used in animal feed mixes. Other uses, which enable a better added value to be obtained, necessitate its demineralization. They include its conversion by hydrolysis of the lactose which it contains into glucose and galactose as an ingredient of ice creams, its use as a substrate in the production of alcohol by fermentation and, principally, its conversion into an ingredient of humanized milks and special milks for feeding infants. The last application in particular requires rigorous demineralization compatible with a low osmotic charge of the infants' milks.

In theory, demineralization should be possible by ultra-filtration or reverse osmosis, but reverse osmosis is too specific and ultrafiltration is accompanied by a significant loss of lactose, a valuable sugar which is desired to be recovered. In practice, two different processes have been used separately or in combination to demineralize whey, namely, electrodialysis and ion exchange.

In electrodialysis, the ionized salts of a solution migrate under the effect of an electrical field through membranes selectively permeable to the cations and the anions. This method promotes elimination of the monovalent ions and can only be used at considerable cost for demineralization beyond 70%. This is why it is used for demineralization, for example, between 40 and 45% prior to ion exchange when it is desired to obtain rigorous demineralization, as for example in French Pat. No. 2 391 653.

Ion exchange makes use of the ionic equilibria existing between a solid phase (the resin) and a liquid phase (the product to be demineralized). This technique is based on the phenomena of affinity and exclusion according to which the liquid leaves the undesirable ions (for example the cations) in the saturation or exhaustion phase of the resin, the undesirable ions being replaced by the selected ions (for example, $H^+$) with which the ion exchanger had been charged beforehand during the regeneration phase. In the case of whey, the cations of which it is desired to reduce the quantity are the alkali cations ($Na^+$, $K^+$, monovalent) and the alkaline-earth cations ($Ca^{++}$, $Mg^{++}$, divalent), the anions being primarily the ion $Cl^-$. Although deanionization does not involve any problems because it may readily be effected by means of a weak anionic resin in the $OH^-$ cycle which is easy to regenerate, the same does not apply to decationization. Conventionally, decationization is carried out by passage through a strong cationic resin in the $H^+$ cycle which can only be regenerated by using a large excess of concentrated hydrochloric acid. It is difficult to know what should be done with this reagent which has to be neutralized, in general, with sodium hydroxide, before discarding the salt obtained to a purification plant. These dangerous and corrosive chemical products have to be temporarily stored and handled and their neutralization charges the waste waters with large quantities of salt.

According to French Pat. No. 2 390 106, whey is demineralized by a process in which it is passed through an anion exchanger in the $HCO_3^-$ form and then through a cation exchanger in the $NH_4^+$ form arranged in vertically adjacent beds, after which the resins are regenerated with a solution of ammonium hydrogen carbonate, followed by evaporation of the ammonium hydrogen carbonate with which the whey is charged in the form of carbon dioxide and ammonia utilizing its thermal decomposition. This attractive but relatively complex process has the disadvantage that it necessitates supplementary regeneration of the resin beds with hydrochloric acid and sodium hydroxide every 2 to 4 demineralization cycles to maintain the adsorption capacity of the cation exchanger.

The object of the present invention is to minimize the disadvantages attending the decationization of by-products of milk by known methods.

The present invention relates to a process for the decationization of liquid by-products of milk by ion exchange, characterized in that a by-product of the type in question is passed through a weak cationic resin in the $H^+$ cycle and then through a strong cationic resin in the $H^+$ cycle until the desired pH and degree of decationization are reached and in that the resins are regenerated by passing a concentrated aqueous solution of an acid through the strong cationic resin and then through the weak cationic resin.

In the context of the invention, "by-products of milk" are understood to be:

the whey emanating from the conversion of milk into cheese, casein or casein derivatives by coagulation with rennet (sweet) or by the acid method (acidic);

whey of the same type as above which has been subjected to electrodialysis, for example demineralized to 30–70% (according to the definition given below of the degree of demineralization);

an acidic whey which has been neutralized;

a liquid emanating from the deproteinization of a whey, for example, an ultrafiltration permeate;

the above-mentioned products in reconstituted or concentrated form.

A preferred starting material available in large quantities is the sweet whey produced in cheesemaking of which the approximate composition by weight and the pH are as follows:

|  | % |
| --- | --- |
| Lactose | 4.0 to 5.0 |
| Proteins (essentially lactalbumin) | 0.6 to 0.8 |
| Mineral salts (above all $Na^+$, $K^+$, $Ca^{++}$) | 0.4 to 0.6 |
| Fats (residual) | 0.2 to 0.4 |
| Dry matter | 5.3 to 6.6 |
| pH | 5.9 to 6.5 |

It can be seen that, proportionally to the proteins, the whey is very rich in mineral cations although they are present in a state of very high dilution. Thus, the preferred starting material is a concentrated whey which has been concentrated, for example, thermally under moderate heating conditions, to a dry matter content of from 18 to 25% by weight and preferably from 19 to 23% by weight. Whether crude or concentrated, the whey is advantageously freed from the suspended particles by clarification and skimmed to a residual fat content of less than about 0.05% by weight. These operations may be carried out in known manner by filtration and high-speed centrifuging, by bactofuging, etc.

The ion exchange process may be carried out in layered beds (in one and the same column), the product being contacted with a mixture of weak and strong cationic resins, or in separate beds (separate columns) which is more favorable from the point of view of regeneration because of the need, in the case of layered beds, to regenerate the resins in countercurrent (mechanical problems of packing the resins).

In the advantageous separate-bed embodiment, in the saturation phase, the liquid is first passed through a weak cationic resin in the $H^+$ cycle (i.e., charged with $H^+$ ion introduced by regeneration). The resin used may be, for example, an AMBERLITE® IRC-84, a product of the Rohm and Haas Company, consisting of beads of crosslinked acrylic acid polymer containing carboxylic functional groups.

Contacting is carried out by percolation of the liquid product downwards over the resin in a column at a temperature in the range from 4° to 40° C. and preferably at a temperature in the range from 4° to 15° C. The weak cationic resin retains primarily the divalent alkaline-earth cations ($Ca^{++}$, $Mg^{++}$).

The liquid issuing from the bottom of the column is then percolated downwards over a strong cationic resin in the $H^+$ cycle. The resin used may be, for example, an AMBERLITE® IR-120, a product of the Rohm and Haas Company, consisting of beads of a crosslinked styrene/divinyl benzene copolymer containing sulfonic functional groups. The strong cationic resin becomes charged with the remaining divalent alkaline-earth cations (above all $Ca^{++}$) and primarily with the monovalent alkali cations ($Na^+$, $K^+$).

The quantity of whey which can be treated depends on the quantity of mineral cations which it contains, on its pH-value, on the pH-value of the decationized whey which it is desired to obtain after the ion exchange and upon the final degree of demineralization required. In the context of this specification, the "degree of decationization" is understood to be the ratio, expressed in %, of the quantities of cations eliminated from the whey (i.e., the difference between the quantitites of cations in the starting whey and the residual quantities in the demineralized whey) to the quantities of cations in the starting lactoserum converted to the same percentages of dry matter.

A first embodiment of the process according to the invention comprises treating a whey containing 19-23% of dry matter which has been concentrated as described above in such a way that it has a final pH of from 1.0 to 2.5.

In one preferred embodiment which enables a pH of from 1.8 to 2.1 and a total degree of demineralization of from 35 to 55% or a degree of decationization of from 60 to 80% to be obtained, the apparent volumes of the weak cationic and strong cationic resins are in a ratio dictated by their respective exchange capacities, for example, 1:3 to 1:1. In one particularly advantageous embodiment, a column charged with weak cationic resin is connected to two columns of strong cationic resin arranged in series. In this way, it is possible to treat from 0.8 to 1 kg of dry extract per total ion exchange equivalent (valence-gram of exchange per unit of resin volumn, hereinafter eq./1 or practical adsorption capacity). This represents a volume of whey containing 19-23% of dry matter concentrated as described above corresponding to approximately six times the apparent volume of resin whereas the use of a strong cationic resin alone only enables around 3.5 times the volume of resin to be treated. Thus, according to the invention, the capacity of the strong cationic resin is utilized to approximately 90% of the theoretical capacity as against 50-60% where it is used on its own.

In a second embodiment of the process according to the invention, the concentrated whey containing 19-23% of dry matter is electrodialyzed to a degree of demineralization (cations and anions) of 30-70% and the intermediate product is treated by cation exchange. In this case, the pH of the product after decationization by the process according to the invention is in the range from 2.0 to 3.5 and the degree of decationization in the range from 70 to 95%. It is thus possible to treat from 1.1 to 2.5 kg of dry extract per total ion exchange equivalent. This represents a volume of concentrated 19-23% whey of as high as 15 times the volume of resin used.

The following explanation may be given for the remarkable increase in the decationization capacity of the arrangement of the process according to the invention compared with the use of strong cationic resin on its own:

At the beginning of decationization, all the cations attach themselves to the weak cationic resin, R schematically symbolizing the matrix (fixed part) of the resin, only the predominant cations being indicated in the interests of simplification:

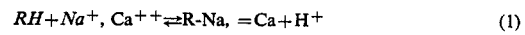
$$RH + Na^+, Ca^{++} \rightleftharpoons R\text{-}Na, = Ca + H^+ \qquad (1)$$

The $Na^+$ ions are then exchanged for $Ca^{++}$ ions:

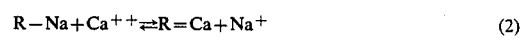
$$R-Na + Ca^{++} \rightleftharpoons R = Ca + Na^+ \qquad (2)$$

This resin fixes approximately 50% of the $Ca^{++}$ and $Mg^{++}$ ions, the greater part of the $Na^+$ and $K^+$ ions still being present in the liquid together with approximately 50% of the alkaline-earth cations in the form of soluble complexes (citrates). It thus acts as a filter by chromatographic effect, selectively retaining some of the alkaline-earth cations.

The strong cationic resin fixes the alkali cations which has the effect of reducing the pH to approximately 1.2:

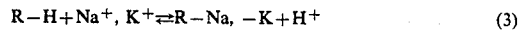
$$R-H + Na^+, K^+ \rightleftharpoons R-Na, -K + H^+ \qquad (3)$$

Under these strongly acidic conditions, the complexes of alkaline-earth cations dissociate:

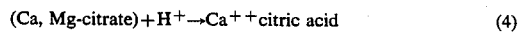
$$(Ca, Mg\text{-citrate}) + H^+ \rightarrow Ca^{++} \text{citric acid} \qquad (4)$$

The alkali and alkaline-earth cations compete with one another:

$$R-H + Ca^{++} \rightleftharpoons R = Ca + H^+ \qquad (5)$$

The exhaustion of the resin at the end of the saturation phase is accompanied by a desorption of the $Na^+$ ions on account of their low affinity for the resin:

$$R-Na + K^+ \rightleftharpoons R-K + Na^+ \qquad (6)$$

This undesirable phenomenon of ion leakage is responsible for an increase in the pH.

Continuous measurement of the pH at the exit of the last column of strong cationic resin thus enables the degree of saturation to be monitored To enable the process to be carried out efficiently, the resins have to be regenerated. This operation is intended to remove the ions which have been fixed by the resins and to replace them by those which it is desired to introduce into the liquid to be treated, in the present case $H^+$. The regeneration with $H^+$ ions of a strong cationic resin is relatively ineffective although the regenerated sites are generally utilized effectively during the saturation phase. It follows from this that the capacity of a strong cationic resin depends upon its degree of regeneration. It is for this reason that effective regeneration generally requires a large excess of acid of from 1.5 to 6 times the practical capacity of the resin expressed in eq/l. These proportions depend on the type of regenerant and on the tolerated level of ion leakage.

The regeneration phase is carried out by circulating an acid, for example, an aqueous solution of hydrochloric acid having a concentration of from 8 to 10% by weight first over the strong cationic resin and then over the weak cationic resin, preferably in the downward direction, because counter-current regeneration necessitates the use of mechanical means for immobilizing the bed of resin which make regeneration difficult to carry out in this way. It has been found that the resins can be regenerated with 30 to 40% less acid compared with decationization with a strong cationic resin on its own for the same practical capacity.

The process according to the invention enables strong cationic resins to be economically regenerated with quantities of acid that would be unimaginable in the case of a conventional process. In the advantageous embodiment comprising three columns, i.e., one column of weak cationic resin (I) connected in series to two columns of strong cationic resin (II and III), all the acid required for regeneration of the system passes over the resin of column III, i.e., approximately 3.3 times its practical capacity for the desired level of regeneration, the resin of column II utilizes approximately 2.5 times its practical capacity and the resin of column I utilizes the excess acid of the system, i.e., approx. 1.7 times its practical capacity.

In one preferred embodiment of the regeneration phase, part of the acid issuing from the column of weak cationic resin is used for the regeneration head of the preceding column of strong cationic resin. If two columns of strong cationic resin connected in series are used, it is possible with advantage to interchange them periodically so as to avoid any accumulation of ions, for example $K^+$ and $Ca^{++}$, in that column preceding the column of weak cationic resin (in the regeneration direction).

The decationized whey of pH 1.8 to 2.1 obtained by the first embodiment of the process according to the invention is advantageously used for making "lactoproteins", i.e., a demineralized whey partially freed from lactose. The pH conditions facilitate selective crystallization of the lactose (without entraining proteins). After crystallization of approximately one third of the lactose present in the decationized whey, the mother liquors are deanionized (essentially $Cl^-$), for example, by anion exchange or electrodialysis, and "lacto-proteins" containing approximately 30 to 40% proteins and approximately 45 to 55% by weight of lactose, based on dry matter, are obtained after neutralization and drying.

Alternatively, there is no need to separate any of the lactose. In this case, a demineralized lactoserum-containing product containing approximately 9 to 15% by weight of proteins and approximately 75 to 85% by weight of lactose, based on dry matter, is obtained after deanionization, neutralization and drying.

The pre-electrodialyzed whey of pH 2.0 to 3.5 obtained by the second embodiment of the process according to the invention may be treated in accordance with French Pat. No. 2 391 653 to give demineralized lactoserum products containing the proteins and the lactose of the starting whey, i.e., approximately 9 to 15% of proteins and approximately 75 to 85% of lactose.

The invention is illustrated by the following Examples in which the parts and percentages are by weight, unless otherwise indicated. The Examples are in turn illustrated by the accompanying drawings.

EXAMPLE 1

Figure 1:
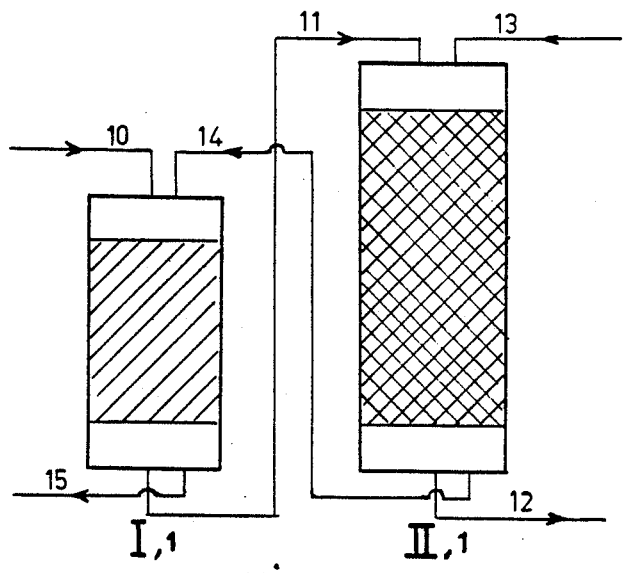
FIG. 1 diagrammatically illustrates one embodiment of a decationization cycle (Example 1) and a regeneration cycle (Example 7)

Decationization 365 kg of sweet whey (emanating from the coagulation of milk by rennet in the making of Emmental), which has been concentrated to a dry matter content of 19.9% and of which the pH is 6.4, is successively passed downwards at 13° C. and at a rate of 3.6 l/min. (FIG. 1): via the pipe 10 through the column I,1 charged with 12 l (apparent volume) of weak cationic resin AMBERLITE ® IRC-84, a product of the Rohm & Haas Company) and then downwards via the pipe 11 through the column II,1 charged with 34 l (apparent volume) of strong cationic resin (AMBERLITE ® IR-120, a product of the Rohm & Haas Company).

The decationized whey leaves via the pipe 12.

Table 1 below shows the pH and the quantities of the principal cations of the starting whey at the exit of column I,1 and at the exit of column II,1, expressed in g and in equivalents, and also the degree of decationisation per cation and the total degree of decationisation.

TABLE 1

|  | Starting whey | | Exit of col. I,1 | | Exit of col II,1 | | Degree of decationisation (%) | |
|---|---|---|---|---|---|---|---|---|
|  | g | eq. | g | eq. | g | eq. | per cation | total |
| $Na^+$ | 567.7 | 24.7 | 544.7 | 23.7 | 252.6 | 11.0 | 55.5 |  |
| $K^+$ | 1979.0 | 50.6 | 1834.3 | 46.9 | 298.2 | 7.6 | 85.0 |  |
| $Ca^{++}$ | 443.2 | 22.1 | 139.2 | 6.9 | 43.2 | 2.1 | 90.5 |  |
| $Mg^{++}$ | 42.3 | 3.5 | 27.9 | 2.3 | 7.5 | 0.6 | 82.9 |  |
| Total | — | 100.9 | — | 79.2 | — | 21.3 | — | 78.9 |
| pH | 6.4 | | 4.5 | | 1.6 | | | |

Table 2 below shows the quantities of the principal cations retained in the columns, expressed in g and in equivalents, and also the practical adsorption capacity of the resin, expressed in eq./l.

TABLE 2

|  | Column I,1 | | Column II,1 | |
|---|---|---|---|---|
|  | g | eq. | g | eq. |
| $Na^+$ |  |  | 23.0 | 1.0 | 292.1 | 12.7 |

TABLE 2-continued

|  | Column I,1 | | Column II,1 | |
|---|---|---|---|---|
|  | g | eq. | g | eq. |
| K+ | 144.7 | 3.7 | 1536.1 | 39.3 |
| Ca++ | 804.0 | 15.2 | 96.0 | 4.8 |
| Mg++ | 14.4 | 1.2 | 20.4 | 1.7 |
| Total | — | 21.1 | — | 58.5 |
| Practical adsorption capacity eq./l | — | 1.76 | — | 1.72 |
| Theoretical adsorption capacity eq./l | — | — | — | 1.9 |
| Regeneration level eq. HCl/l of strong cationic resin (to regenerate column II,1 and column I,1) |  |  |  | 2.8 |

It can be seen that the practical adsorption capacity of the strong cationic resin corresponds to approximately 90% of its theoretical capacity when it is placed in line after a weak cationic resin.

COMPARISON EXAMPLES

1. If the same whey is conventionally decationized using only one column filled with strong cationic resin (AMBERLITE® IR-120, a product of the Rohm & Hass Company), a total degree of decationization of 60.8% is obtained whilst the practical exchange capacity is 1.1 eq./l, i.e., only about 58% of the theoretical capacity for a regeneration level of 2.2 eq. HCl/l of resin.

2. The use of a column of weak cationic resin (AMBERLITE® IRC-84, a product of the Rohm & Haas Company) alone to demineralize the same whey results in a degree of decationization of 20.3% with a practical exchange capacity of 1.47 eg./l for a regeneration level of 2.5 eq. HCl/l of resin.

EXAMPLES 2-4

EXAMPLE 2

Figure 2:
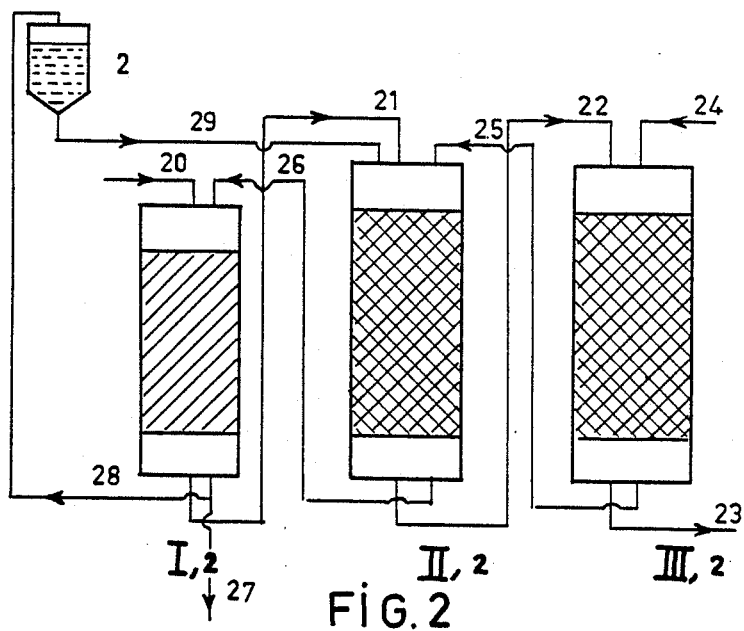
FIG. 2 diagrammatically illustrates a preferred embodiment of a decationization cycle (Example 2) and two variants of a regeneration cycle (Examples 6 and 8).

The arrangement shown in FIG. 2 is used for decationizing 522 kg of sweet whey concentrated to 19.15% of dry matter, pH 6.4, at a temperature of 13° C. and at a rate of 3.6 l/min. in the following order: downwards via the pipe 20 through the column I,2 charged with 24 l of weak cationic resin (AMBERLITE® IRC-84, a product of the Rohm & Haas Company), downwards via the pipe 21 through the column II,2 charged with 26 l of strong cationic resin (AMBERLITE® IR-120, a product of the Rohm & Haas Company) and then downwards via the pipe 22 through the column III,2 charged with 26 l of strong cationic resin (AMBERLITE® IR-120, a product of the Rohm & Hass Company). The decationized whey issues via the pipe 23.

EXAMPLE 3

The procedure described in Example 2 is adopted for decationizing 792 kg of sweet whey concentrated to 19.62% of dry matter, pH 6.22, at a temperature of 12° C. and at a rate of 3.3 l/min.

EXAMPLE 4

The procedure described in Example 2 is adopted for decationizing 559 kg of sweet whey concentrated to 19.85% of dry matter, pH 6.32, at a temperature of 12° C. and at a rate of 3.6 l/min. In Tables 3 and 5 below the residual fat makes up the balance to 100% based on dry matter.

Table 3 below shows the composition of the starting whey, the quantities of the principal cations before and after decationization and the pH after decationization.

TABLE 3

| Composition of the whey based on dry matter (%) | Example 2 | | Example 3 | | Example 4 | |
|---|---|---|---|---|---|---|
|  | before | after | before | after | before | after |
| Proteins (nitrogen 6.38) | 13.63 | 13.06 | 14.3 | 13.7 | 12.8 | 13.7 |
| Lactose | 72.6 | 75.2 | 70.3 | 75.0 | 72.0 | 75.9 |
| Ash | 7.78 | 3.31 | 7.49 | 3.43 | 8.31 | 3.47 |
| made up of |  |  |  |  |  |  |
| Na+ (mg/100 g) | 706 | 75 | 724 | 430 | 932 | 46 |
| K+ (mg/100 g) | 2309 | 13 | 2329 | 879 | 2348 | 3 |
| Ca++ (mg/100 g) | 513 | 13 | 490 | 12 | 524 | 9 |
| Mg++ (mg/100 g) | 117 | 13 | 115 | 28 | 113 | 2 |
| pH | — | 1.2 | — | 2.1 | — | 1.0 |

Table 4 below shows the degree of decationization in % based on the starting quantity expressed in mg/100 g of dry matter.

TABLE 4

| Cation | Example | | |
|---|---|---|---|
|  | 2 | 3 | 4 |
| Na+ | 89.4 | 40.4 | 95.1 |
| K+ | 99.4 | 62.3 | 99.9 |
| Ca++ | 97.5 | 97.5 | 98.3 |
| Mg++ | 88.9 | 75.6 | 98.2 |

Conversion into a demineralized lactoserum product 110 l of the decationized product of Example 4 is passed downwards through a column filled with 28 l of a weak anionic resin based on a divinyl benzene/styrene copolymer containing amino group in the OH− cycle (AMBERLITE® IRA-93, a product of the Rohm & Haas Company) at a rate of 2.15 l/min. A liquid is thus obtained of which the pH and composition are shown in Table 5.

TABLE 5

| Composition of the whey based on dry matter (%) |  |
|---|---|
| Proteins | 14.58 |
| Lactose | 81.3 |
| Ash | 0.62 |
| made up of |  |
| Na+ (mg/100 g) | 30 |
| K+ (mg/100 g) | 12 |
| Ca++ (mg/100 g) | 36 |
| Mg++ (mg/100 g) | 2 |
| Cl− (mg/100 g) | 1.3 |
| P (mg/100 g) (in different ionic forms, mainly in the form of monovalent phosphate ions) | 163 |
| Citric acid (in different ionic forms) | 0.72 |
| pH | 4.6 |

A dried lactoserum product is obtained from the above liquid after neutralization and drying.

EXAMPLE 5

44.5 l of whey concentrated to a dry matter content of 23%, of which the composition and pH are shown in Table 6 below, are passed successively:

A. through an electrodialysis unit comprising 5 cells at a temperature of 30° C. and under a voltage of 300 V at a rate of 88 l/min. up to a total degree of demineralization of 68.5%, B. through a decationization arrangement comprising in series one column filled with 1 l of weak cationic resin (AMBERLITE® IRC-84) and two columns each filled with 1 liter of strong cationic resin (AMBERLITE ® IRC-120) and C. through a deanionization column filled with 1.5 l of weak anionic resin (AMBERLITE ® IRA-93).

TABLE 6

| Composition of the whey based on dry matter (%) | Starting | After A | After B | After C |
|---|---|---|---|---|
| Proteins (nitrogen 6.38) | 12.03 | 12.46 | 13.09 | 13.48 |
| Lactose | 72.99 | 78.86 | 81.03 | 82.21 |
| Ash | 8.16 | 2.57 | — | — |
| made up of | | | | |
| $Na^+$ (mg/100 g) | 886 | 260 | 22 | 23 |
| $K^+$ (mg/100 g) | 2423 | 315 | 18 | 18 |
| $Ca^{++}$ (mg/100 g) | 569 | 416 | 31 | 27 |
| $Mg^{++}$ (mg/100 g) | 123 | 88 | 18 | 14 |
| $Cl^-$ (mg/100 g) | 1702 | 51 | — | 0 |
| P (mg/100 g) (in different ionic forms, depending on the pH) | 651 | 340 | — | 150 |
| Citric acid (in different ionic forms, depending on the pH) | 2.48 | 1.68 | — | 0.27 |
| pH | 6.31 | 5.80 | 2.78 | 4.85 |

The compositions of the liquids are shown in Table 6 above, wherein the residual fat makes up the balance to 100% based on dry matter. After neutralization and drying, a demineralized lactoserum product is obtained.

EXAMPLE 6

The decationization of whey by the method of Example 3 using columns I (1200 l, AMBERLITE ® IRC-84, a product of the Rohm & Haas Company), II (1300 l, AMBERLITE ® IR-120, a product of the Rohm & Haas Company) and III (1300 l, AMBERLITE ® IR-120, a product of the Rohm & Haas Company) over a period of 152 mins. at a rate of 10800 l/h results in a charge of the columns corresponding to 1.68 eq./l (I), 1.8 eq./l (II) and 1.8 eq./l (III).

The residual whey is forced through, rinsed with water and the water forced through in the direction I→II→III, these operations lasting a total of about 25 mins. The resins are loosened up by circulating water and then air upwards through them in parallel (I, II, III) for about 7 minutes, after which they are washed by circulating water upwards through them for about 25 mins. at a rate of 20,000 l/h in the direction I→II→III.

Water is then circulated upwards in the direction II→I, III for 10 mins. at successive rates of 10,000 and 5,000 l/h, which enables the resin beads to be graded by size, the smallest going to the top of the columns. The liquid is then adjusted to the desired level in about 10 mins. The columns are then ready to be regenerated.

Regeneration

In the above system of columns, experience has shown that, for effective regeneration, HCl has to be used in a quantity corresponding to the mean practical adsorption capacity, i.e., approximately 2.9 eq. HCl/l of resin in the case of column I for a practical adsorption capacity of 1.7 eq./l.

2850 l of a 10% hydrochloric acid solution (corresponding to 298 kg of pure HCl) are circulated downwards through the columns in the direction III→II→I (opposite to decationization) via the pipes 24, 25 and 26 for a period of 35 mins. All the effluents including 1000 l of a 5% HCl solution (52.3 kg) are removed via the pipe 27 at the end of the operation.

After regeneration, the columns are washed with water circulating downwards for 30 mins. at a rate of 5000 l/h in the direction III→II→I and are then restored to the desired level by introducing water in the direction I→II→III. They are then ready for another decationization.

EXAMPLE 7

The arrangement according to Example 1 is regenerated in the same way as in Example 6 using an aqueous HCl solution supplying the equivalent of 3.5 kg of pure HCl via the pipes 13, 14 and 15 downwards in the direction II→I.

COMPARISON EXAMPLE

3. A decationization according to Comparison Example 1 of the same quantity of whey requires the equivalent of 4.8 kg of pure HCl.

EXAMPLE 8

Regeneration of the columns is carried out in the same way as in Example 6, except that 980 l of a 5% HCl solution are circulated downwards from the buffer tank 2 via the pipe 29 (the solution having been recovered at the exit of the column I via the pipe 28 after a previous regeneration) through the columns II→I in 12 minutes, after which 2500 l of a fresh 10% HCl solution are circulated downwards in the direction III→II→I in 30 mins. and the equivalent of 3.4 kg of pure HCl is removed via the pipe 27 in 30 mins. The columns are thus regenerated using the equivalent of 261 kg of pure HCl.

COMPARISON EXAMPLE

4. By comparison, a decationization according to Comparison Example 1 of the same quantity of whey requires the equivalent of 360 kg of pure HCl for regenerating the column of strong cationic resin.

We claim:

1. A process for decationizing and obtaining decationized products from whey products comprising passing whey products through a weak cationic resin charged with $H^+$ ions and then through a strong cationic resin charged with $H^{30}$ ions for obtaining decationized whey products and subsequently passing a concentrated aqueous solution of an acid through the strong cationic resin and then through the weak cationic resin for regenerating and recharging the resins with $H^{30}$ ions for the decationization the whey products with the resins.

2. A process according to claim 1 further comprising passing the decationized whey products through a strong cationic resin charged with $H^+$ ions for further decationization and first passing the acid through the strong resin through which the decationized products were passed and then passing the acid through the other strong resin and then through the weak resin for regenerating and recharging the resins with $H^+$ ions for decationizing the whey products.

3. A process according to claim 1 or 2 wherein the whey products have a dry matter content of from 18% to 25% by weight.

4. A process according to claim 1 or 2 wherein the resins are contained in columns and the whey products and acid are passed downwards through each column.

5. A process as claimed in claim 2 further comprising passing and recycling acid issuing from the first column to the second column for regenerating and recharging the resin with $H^{30}$ ions.

6. A process according to claim 1 or 2 wherein the weak cationic resin and strong cationic resin have apparent volumes in a ratio of weak cationic resin to strong cationic resin of from 1:3 to 1:1.

7. A process according to claim 6 wherein the whey products are demineralized to a degree of demineralization of from 35% to 55% and decationized to a degree of decationization of from 60% to 80%.

8. A process according to claim 1 or 2 wherein the whey products to be decationized have been partially demineralized by electrodialysis and are passed through the resins for obtaining a decationized product having a degree of decationization of from 70% to 95%.

9. A process according to claim 8 wherein the decationized product has a pH of from 2.0 to 3.5.

10. A process according to claim 8 further comprising deanionizing, neutralizing and drying the decationized products.

11. A process according to claim 1 or 2 further comprising deanionizing, neutralizing and drying the decationized products.

12. A process according to claim 1 wherein the decationized product has a pH of from 1.0 to 2.5.

13. A process according to claim 1 wherein the decationized product has a pH of from 1.8 to 2.1.

14. A process according to claim 13 further comprising crystallizing and collecting lactose from the decationized products.

15. A process as claimed in claim 14 further comprising deanionizing, neutralizing and drying the decationized product after collecting the lactose from the decationized products.

* * * * *

UNITED STATES PATENT AND TRADEMARK OFFICE
CERTIFICATE OF CORRECTION

PATENT NO. : 4,803,089

DATED : Feb. 7, 1989

INVENTOR(S) : Michel CHAVERON, et al.

It is certified that error appears in the above-identified patent and that said Letters Patent is hereby corrected as shown below:

Column 1, line 4, insert --co-pending-- after "of"; line 5, insert --06/-- before "700,765"; and insert a comma after "700,765."

Column 3, line 3, insert a period after "etc."

Column 4, line 54, "$Ca^{++}$ citric acid" should be --$Ca^{++}$ + citric acid--.

Column 5, line 3, insert a period after "monitored".

Column 8, line 32, "group" should be --groups--.

Column 10, lines 43 and 48, [Claim 1, lines 5 and 9], "$H^{30}$" should be --$H^+$--.

Column 10,, line 68, [Claim 5, line 4] "$H^{30}$" should be --$H^+$--.

Signed and Sealed this

Twenty-second Day of August, 1989

Attest:

DONALD J. QUIGG

Attesting Officer

Commissioner of Patents and Trademarks